US 9,354,993 B2

(12) United States Patent
Radhakrishnan (10) Patent No.: US 9,354,993 B2
(45) Date of Patent: May 31, 2016

(54) SYSTEM AND METHOD TO REDUCE SERVICE DISRUPTION IN A SHARED INFRASTRUCTURE NODE ENVIRONMENT

(71) Applicant: Ramesh Radhakrishnan, Austin, TX (US)

(72) Inventor: Ramesh Radhakrishnan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 315 days.

(21) Appl. No.: 13/797,541

(22) Filed: Mar. 12, 2013

(65) Prior Publication Data

US 2014/0281448 A1    Sep. 18, 2014

(51) Int. Cl.
*G06F 15/177* (2006.01)
*G06F 11/20* (2006.01)
*G06F 11/00* (2006.01)

(52) U.S. Cl.
CPC ............ *G06F 11/203* (2013.01); *G06F 11/006* (2013.01); *G06F 11/2035* (2013.01)

(58) Field of Classification Search
CPC .............. G06F 11/203; G06F 11/2025; G06F 11/2033; G06F 11/2041; G06F 11/2043
USPC ........................................................... 713/2
See application file for complete search history.

(56) References Cited

U.S. PATENT DOCUMENTS

| | | | | |
|---|---|---|---|---|
| 8,904,204 B2 * | 12/2014 | Fletcher et al. | ............... | 713/300 |
| 2005/0044220 A1 * | 2/2005 | Madhavan | ..................... | 709/225 |
| 2006/0153188 A1 * | 7/2006 | Doi et al. | ........................ | 370/389 |
| 2006/0294351 A1 * | 12/2006 | Rostampour | ..................... | 713/1 |
| 2007/0038885 A1 * | 2/2007 | Hartung | ............................ | 714/4 |
| 2008/0229146 A1 * | 9/2008 | Arai | ................................ | 714/13 |
| 2009/0172125 A1 * | 7/2009 | Shekhar et al. | ............... | 709/215 |
| 2011/0161729 A1 * | 6/2011 | Ritz et al. | ......................... | 714/13 |
| 2012/0203875 A1 * | 8/2012 | Dake et al. | ..................... | 709/220 |
| 2014/0007134 A1 * | 1/2014 | Fletcher et al. | ............... | 718/106 |
| 2014/0143391 A1 * | 5/2014 | Tanigawa et al. | ............. | 709/221 |

OTHER PUBLICATIONS

M. Kozuch et al., "Migration without Virtualization", *HotOS 2009*, 5 pages, 2009.
J. Chiang et al., "Physical Machine State Migration", *2011 IEEE 17th International Conference on Parallell and Distributed Systems*, 8 pages, 2011.

* cited by examiner

*Primary Examiner* — Vincent Tran
(74) *Attorney, Agent, or Firm* — Baker Botts L.L.P.

(57) ABSTRACT

A method of reducing downtime in a node environment is disclosed. The method includes identifying an originating system board of a plurality of system boards that requires service where the originating system board includes a node operating on a processor. The method further includes identifying a target system board of the plurality of system boards where the target system board includes a target processor. The method further includes transferring operation of the node to the target processor before the originating system board is serviced, and operating the node on the target processor.

17 Claims, 4 Drawing Sheets

SYSTEM AND METHOD TO REDUCE SERVICE DISRUPTION IN A SHARED INFRASTRUCTURE NODE ENVIRONMENT

TECHNICAL FIELD

This disclosure relates generally to information handling systems and more particularly to information handling systems including nodes configured to share physical components.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. For example, an information handling system may be a tablet computer or mobile device (e.g., personal digital assistant (PDA) or smart phone) configured to transmit data on a wireless communications network. Information handling systems may include a variety of hardware and software components that may be configured to process, store, and communicate information and may include one or more computer systems, data storage systems, and networking systems.

As space constraints increase, there is pressure to increase the density of information handling systems by housing a greater number of nodes in an information handling system chassis. In an information handling system configured to house rack servers, it is not uncommon for a system board, power supply and other physical components to be associated with each node. To increase the density of an information handling system, however, the information handling system may be configured such to share physical components, such as a system board, a power supply, and/or fans.

SUMMARY

In one embodiment of the present disclosure, a method of reducing downtime in a node environment is disclosed. The method includes identifying an originating system board of a plurality of system boards that requires service where the originating system board includes a node operating on a processor. The method additionally includes identifying a target system board of the plurality of system boards where the target system board includes a target processor. The method further includes transferring operation of the node to the target processor before the originating system board is serviced, and operating the node on the target processor.

In another embodiment of the present disclosure, an information handling system including a plurality of system boards, a plurality of storage devices communicatively coupled to the plurality of system boards, and a controller communicatively coupled to the plurality of system boards and the plurality of storage devices is disclosed. The controller is configured to identify an originating system board of the plurality of system boards that requires service where the originating system board includes a node operating on a processor. The controller is additionally configured to identify a target system board of the plurality of system boards where the target system board includes a target processor. The controller is further configured to transfer operation of the node to the target processor before the originating system board is serviced.

In yet another embodiment of the present disclosure, a non-transitory computer-readable medium including computer-executable instructions encoded in the computer-readable medium is disclosed. The instructions, when executed by a processor, are operable to perform operations including identifying an originating system board of a plurality of system boards that requires service where the originating system board includes a node operating on a processor. The instructions, when executed by a processor, are additionally operable to perform operations including identifying a target system board of the plurality of system boards where the target system board includes a target processor. The instructions, when executed by a processor, are further operable to perform operations including transferring operation of the node to the target processor before the originating system board is serviced.

BRIEF DESCRIPTION OF THE DRAWINGS

A more complete understanding of the disclosed embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device, and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media, such as a direct access storage device (e.g., a hard disk drive or floppy disk); a sequential access storage device (e.g., a tape disk drive); a compact disk; CD-ROM; DVD; random access memory (RAM); read-only memory (ROM); electrically erasable programmable read-only memory (EEPROM); and/or flash memory; as well as communications media, such as wires, optical fibers, microwaves, radio waves, and other electromagnetic and/or optical carriers; and/or any combination of the foregoing.

An information handling system may be configured such that multiple nodes share physical components. A node may include one or more processors configured to run an instance of an operating system. A node may further include a memory and a storage resource. Shared components may include, for example, a system board, power supply, and/or other physical components necessary to process, store, and/or communicate data. In an information handling system configured in this manner, servicing one of the shared components may require that multiple nodes be powered down and/or taken off-line for the duration of the service. For example, each system board may include multiple processors, each of which functions as an individual node. The applications running on each node may experience a disruption in service if the system board is powered off or otherwise taken off-line for service. In accordance with the teachings of the present disclosure, the system state, metadata, and/or system image of each node on a system board requiring service may be captured and transferred or migrated to a target node on other system boards before the system board is powered down for service. By transferring or migrating the operation of the nodes, instead of powering down or otherwise taking the nodes off-line, the disruption in service experienced by the applications running on the nodes may be reduced or eliminated.

Figure 1:
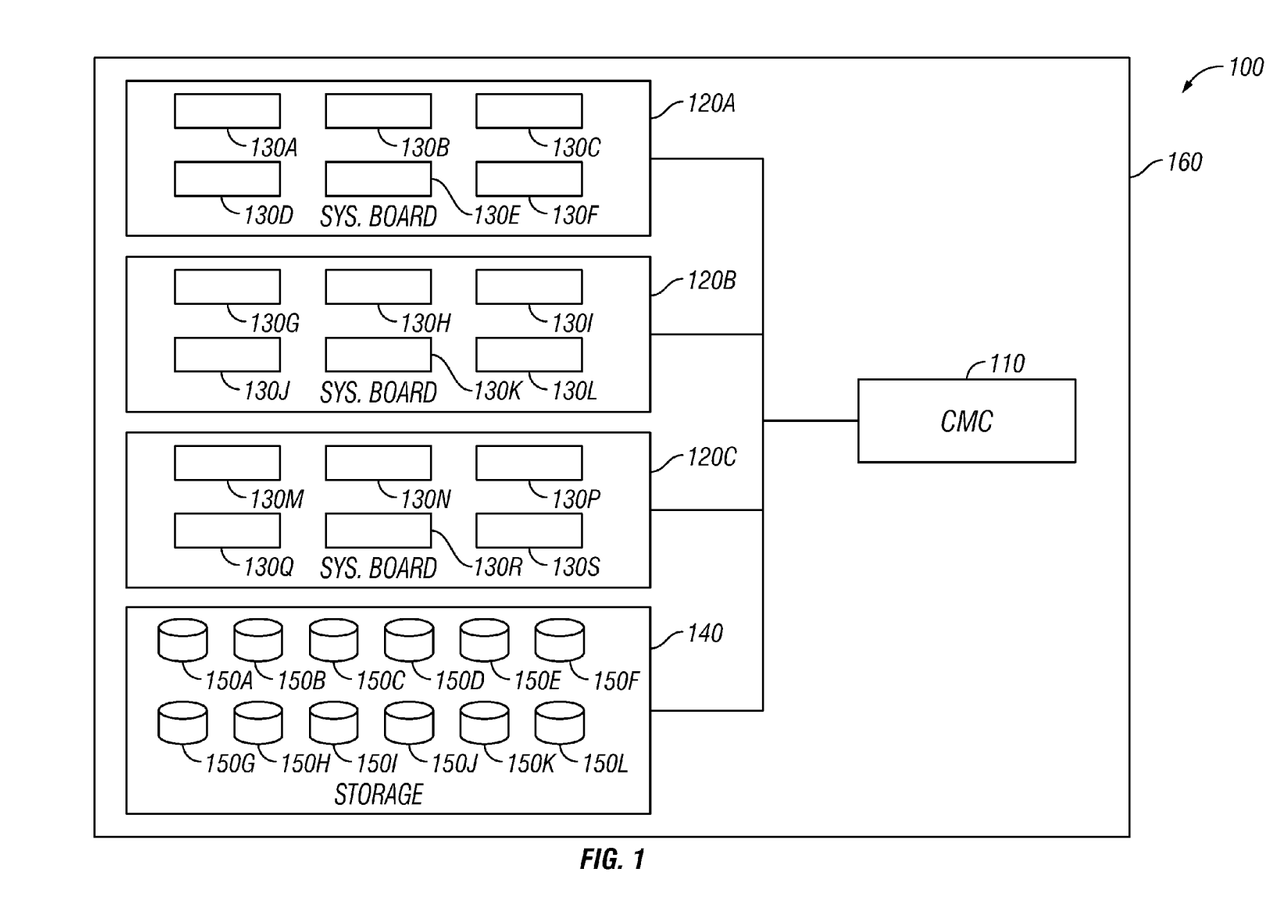
FIG. 1 illustrates an example information handling system including internal storage, in accordance with the teachings of the present disclosure.

FIG. 1 illustrates an example information handling system 100 including internal storage, in accordance with the teachings of the present disclosure. The various components of information handling system 100 may be housed in chassis 160, which may fully or partially enclose the components of information handling system 100. Chassis 160 may include system boards 120, internal storage 140, and a chassis management controller ("CMC") 110.

System boards 120 may include, for example, one or more processors 130. System boards 120 may also include a voltage regulator (not expressly shown), a network interface card (not expressly shown), memory (not expressly shown), a board management controller (not expressly shown), and/or any other component necessary to permit each system board 120 to process, communicate, and/or store data. As shown in FIG. 1, each system board 120 may be communicatively coupled to CMC 110 and internal storage 140. Although FIG. 1 depicts three system boards 120A-120C, chassis 160 may include more or less than three system boards 120.

Processors 130 of system boards 120 may include any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processors 130 may interpret and/or execute program instructions and/or process data stored in internal storage 140 and/or another component of information handling system 100. In some embodiments, processors 130 may include ARM architecture processors. In some embodiments, each processor 130 of a system board 120 may function as an individual node, and may be configured to run an instance of an operating system and/or additional applications. In other embodiments, a plurality of processors may be configured to function as an individual node, and may be configured to run an instance of an operating system and/or additional applications. An operating system image for each node may be stored on a storage resource 150 of internal storage 140. An operating system image may include all the data necessary to operate a particular node. For example, an operating system image may include the operating system and applications running on the node, as well as configuration and files for the operating system and applications running on the node. Although FIG. 1 depicts six processors 130 per system board 120, a system board may include more than or less than six processors.

Internal storage 140 may include any instrumentality or aggregation of instrumentalities that may retain data and/or instructions for a period of time. For example, internal storage 140 may include storage resources 150, which may include random access memory (RAM), electrically erasable programmable read-only memory (EEPROM), a Personal Computer Memory Card International Association (PCMCIA) card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory operable to store data. In some embodiments, one or more of storage resources 150 may be allocated to a particular system board 120. For example, storage resources 150A-150D may be allocated to system board 120A, storage resources 150E-150H may be allocated to system board 120B, and storage resources 150I-150L may be allocated to system board 120C. In such a configuration, the system images for the nodes operating on a particular system board 120 may be stored on the storage resources 150 allocated to that system board 120. In other embodiments storage resources 150A-150L may be shared among system boards 120A-120C. In such a configuration, the system images for the nodes operating on system boards 120A-120C may be distributed among storage resources 150A-150L.

As shown in FIG. 1, CMC 110 may be communicatively coupled to system boards 120 and internal storage 140. CMC 110 may provide a user interface that permits the user to configure and control system boards 120. For example, the user interface may enable a user to schedule service for a particular system board 120. Service may be scheduled, for example, on a routine basis or in response to an error or fault in the operation of the system board. When a particular one of system boards 120 requires service, CMC 110 may either power down nodes operating on the system board 120 requiring service (also referred to as "the originating system board") or transfer the operation of the nodes to unused processors 130 (also referred to as "target processors") on another system board 120 (also referred to as "the target system board"). In some embodiments, the operation of each node operating on an originating system board may be transferred before the originating system board is powered down for service. In other embodiments, the operation of some, but not all, of the nodes operating on an originating system board may be powered down for service, while others may be transferred to a target system board. For example, a distributed application may operate on several nodes spread across several of system boards 120. When one of the nodes fails, the remaining nodes may be configured to take over the operations performed by the failed node. As such, the nodes on which a distributed application is operating may be powered down instead of being transferred before the originating system board is powered down for service.

Consider for example, that system board 120A requires service. CMC 110 may determine which of the nodes operating on processors 130A-130F of system board 120A may be powered down and which may be transferred to system board 120B or system board 120C. For example, a distributed application may be operating on processors 130A, 130G, and 130M of system boards 120A, 120B, and 120C, respectively. The distributed application may be configured such that processors 130G and 130M assume the operations performed by processor 130A in the event processor 130A experiences a failure. As such, CMC 110 may identify the node operating on processor 130A as a node that may be powered down. CMC 110 may identify the nodes operating on the remaining processors 130B-130F of system board 120A for transfer to system boards 120B and/or 120C.

Once CMC 110 has identified the nodes of system board 120A that will be transferred, CMC 110 may identify target processors 130 on system boards 120B and/or 120C to which the nodes may be transferred. The nodes identified for transfer need not be transferred to a single system board 120; instead, they may be distributed between system boards 120B and 120C. In the example, discussed above, CMC 110 identified the nodes operating on processors 130B-130F for transfer; thus, CMC 110 may identify five unused processors on system boards 120B and/or 120C that may serve as target processors. Consider, for example, that CMC 110 determines that processors 130H and 130K on system board 120B, as well as processors 130M, 130N, and 130Q on system board 120C, are unused. Processors 130H, 130K, 130M, 130N, and 130Q may thus be identified by CMC 110 as target processors for the nodes operating on processors 130B-130F.

CMC 110 may capture the system state of the nodes identified for transfer by, for example, freezing all processes running on the nodes and saving, for each node, a snapshot of those processes to memory of the CMC 110. The system state may then be transferred by CMC 110 to target processors 130 on system boards 120B and/or 120C. In some embodiments, CMC 110 may also transfer the system image of the nodes identified for transfer to target processors 130. For example, as discussed above, one or more of storage resources 150 may be allocated to a particular one of system boards 120. Where storage resources are allocated in this manner, CMC 110 may retrieve the system images of the nodes identified for transfer from storage resources 150 allocated to the originating system board 120 because target processors 130 may not otherwise have access to the system images. CMC 110 may then transfer the retrieved system images to target processors 130. In other embodiments, storage resources 150 may be shared among system boards 120A-120C. Where there is shared storage, each of processors 130 on system boards 120 may have access to the particular one of storage resources 150 on which the system image for a particular node is stored. Thus, the system image may be accessed and transferred directly by target processor 130.

Target processors 130 may be initialized in a pre-execution environment (PXE). The system state and system image of the nodes transferred from system board 120A may be loaded on target processors 130 of one or more of system boards 120B or 120C, thereby enabling the transferred nodes to operate on target processors 130. In the example, discussed above, CMC 110 identified the nodes operating on processors 130B-130F for transfer; thus, they system state and system image for the nodes operating on processors 130B-130F may be loaded on target processors 130. By transferring the nodes operating on processors 130B-130F instead of powering down or otherwise taking the nodes off-line, the nodes may operate on target processors 130 and the disruption in service to the applications running on these nodes may be reduced or eliminated.

Figure 2:
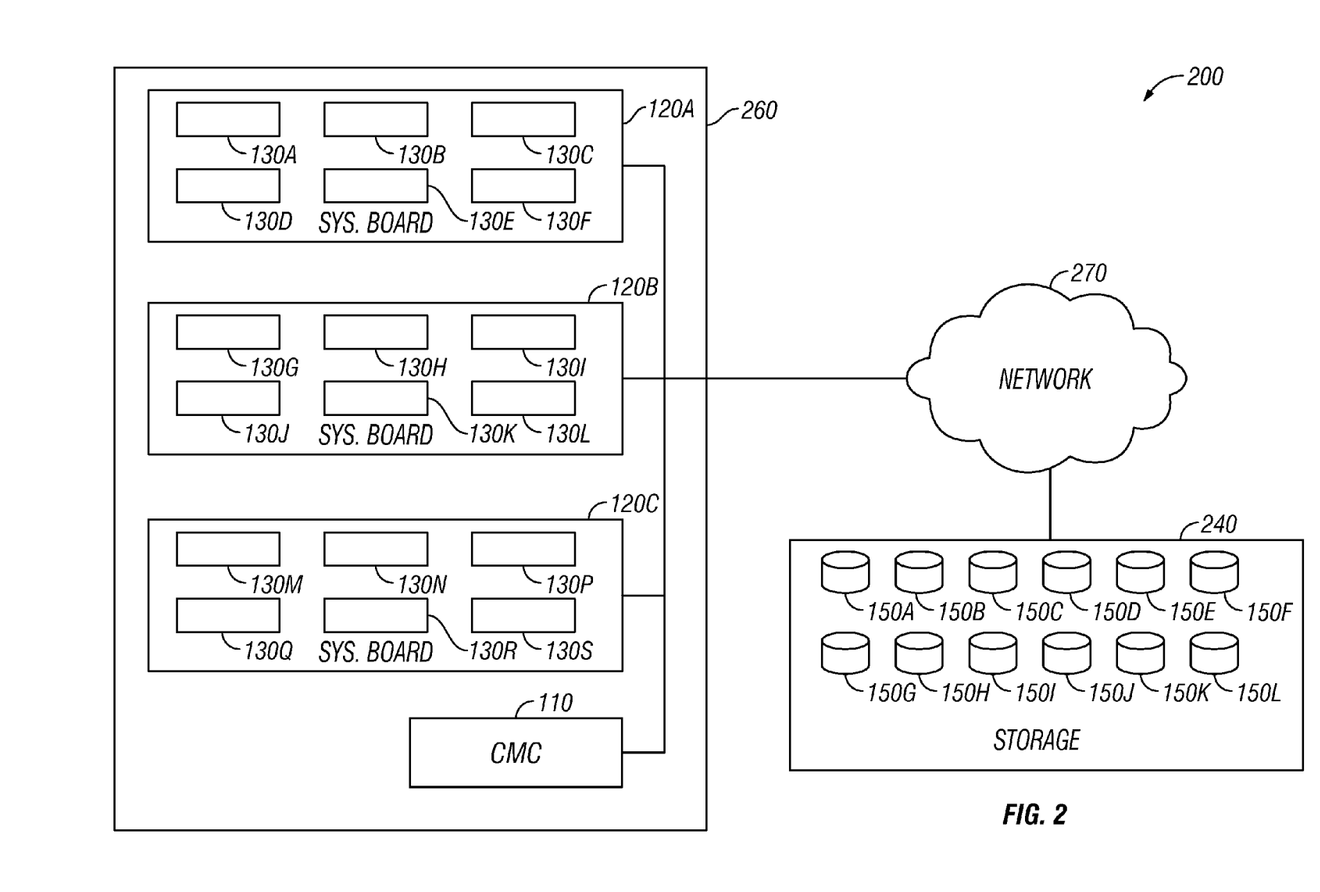
FIG. 2 illustrates an example information handling system including external storage, in accordance with the teachings of the present disclosure.

FIG. 2 illustrates an example information handling system 200 including external storage, in accordance with the teachings of the present disclosure. Information handling system 200 may include CMC 110, system boards 120, external storage 240, and network 270. CMC 110 and system boards 120 may be housed in chassis 260, which may fully or partially enclose the components of information handling system 200. Although FIG. 2 depicts three system boards 120A-120C, chassis 260 may include more or less than three system boards 120.

External storage 240, like internal storage 140, may include any instrumentality or aggregation of instrumentalities that may retain data and/or instructions for a period of time. For example, external storage 240 may include storage resources 150, which are discussed in detail in conjunction with FIG. 1. As discussed above, in some embodiments, one or more of storage resources 150 may be allocated to a particular system board 120. In such a configuration, the system images for the nodes operating on a particular system board 120 may be stored on the storage resources 150 allocated to that system board 120. In other embodiments, storage resources 150 may be shared among system boards 120A-120C. In such a configuration, the system images for the nodes operating on system boards 120A-120C may be distributed among storage resources 150A-150F.

External storage 240 may be communicatively coupled to system boards 120 and CMC 110 via network 270. Network 270 may be a network and/or fabric configured to communicatively couple system boards 120, CMC 110, external storage 240, and/or any element associated with information handling system 200. Network 270 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 270 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), advanced technology attachment (ATA), serial ATA (SATA), advanced technology attachment packet interface (ATAPI), serial storage architecture (SSA), integrated drive electronics (IDE), and/or any combination thereof. Network 270 and its various components may be implemented using hardware, software, or any combination thereof.

As discussed above, when a particular system board 120 requires service, CMC 110 may determine which of the nodes operating on the particular system board 120 may be powered down and which may be transferred to other system boards 120. Consider, for example, that system board 120A requires service. Once CMC 110 has identified the nodes of system board 120A that will be transferred instead of powered down, CMC 110 may identify target processors 130 on system boards 120B and/or 120C to which the operation of the nodes may be transferred.

Once target processors 130 have been identified, CMC 110 may capture and transfer the system state and/or system image of the nodes identified for transfer. As discussed above, in certain embodiments one or more storage resources 150 may be allocated to a particular system board. Where this is the case, CMC 110 may then transfer both the system state and system image for the nodes identified for transfer to target processors 130. As discussed above, CMC 110 may capture the system state for each node identified for transfer. CMC 110 may retrieve the system image for each node identified for transfer from external storage 240 via network 270. In other embodiments, storage resources 150 may be shared among system boards 120. Where there is shared storage, target processors 130 may directly access system images from storage resources 150 via network 270.

As discussed above, target processors 130 may be initialized in a pre-execution environment (PXE). The system state and system image of the nodes identified for transfer may be loaded on target processors 130, thereby enabling the transferred nodes to operate on target processors 130. By transferring instead of powering down or otherwise taking the nodes off-line, the disruption in service to the applications running on these nodes may be reduced or eliminated.

Figure 3:
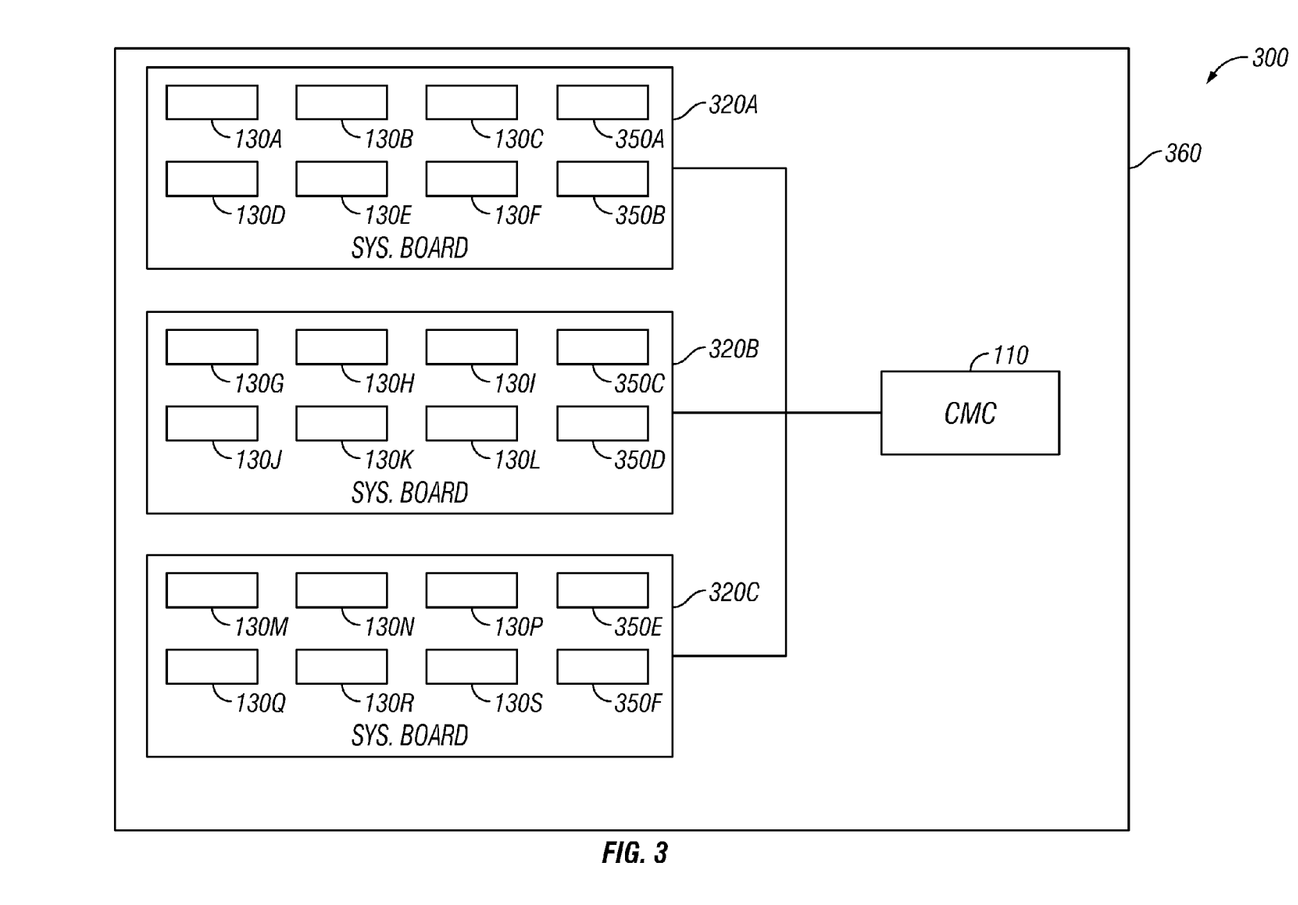
FIG. 3 illustrates an example information handling system including a plurality of system boards with on-board storage, in accordance with the teachings of the present disclosure.

FIG. 3 illustrates an example information handling system 300 including a plurality of system boards with on-board storage, in accordance with the teachings of the present disclosure. Information handling system 300 may include CMC 110 and system boards 320, which may be housed in chassis 360. Chassis 360 may fully or partially enclose the components of information handling system 300.

System boards 320 may include, for example, one or more processors 130 and one or more memory devices 350. System boards 320 may also include a voltage regulator (not expressly shown), a network interface card (not expressly shown), a board management controller (not expressly shown), and/or any other component necessary to permit each system board 320 to process, communicate, and/or store data. As shown in FIG. 3, each system board 320 may be communicatively coupled to CMC 110. Although FIG. 3 depicts three system boards 320A-320C, chassis 360 may include more or less than three system boards 320.

Memory devices 350 may include any instrumentality or aggregation of instrumentalities that may retain data and/or instructions for a period of time. For example, memory devices 350 may include random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

The system images for the nodes operating on a particular one of system boards 320 may be stored on memory devices 350 of the particular system board 320. In such a configuration, memory devices 350 on each system board 320 may be allocated to the particular system board 320 and are not shared with the remaining system boards 320. For example, the system images for nodes operating on system board 320A may be stored on memory devices 350A and/or 350B. Similarly, the system images for nodes operating on system board 320B may be stored on memory devices 350C and/or 350D, while the system images for nodes operating on system board 320C may be stored on memory devices 350E and/or 350F.

Consider, for example, that system board 320A requires service. CMC 110 may determine which of the nodes operating on processors 130A-130F of system board 320A may be powered down and which may be transferred to system board 320B and/or system board 320C. Once CMC 110 has identified which nodes of system board 320A will be transferred, CMC 110 may identify target processors 130 on system boards 320B and/or 320C to which the nodes may be transferred. Because system images for each node are stored on memory devices 350 allocated to the particular system board 320 on which the nodes are operating, CMC 110 may capture and transfer both the system state and the system image for the nodes designated for transfer to target processors 130 on system boards 320B and/or 320C.

As discussed above, target processors 130 may be initialized in a pre-execution environment (PXE). The system state and system image of the nodes identified for transfer may be loaded on the target processors 130, thereby enabling the transferred nodes to operate on the target processors 130. By transferring instead of powering down or otherwise taking the nodes off-line, the disruption in service to the applications running on these nodes may be reduced or eliminated.

Figure 4:
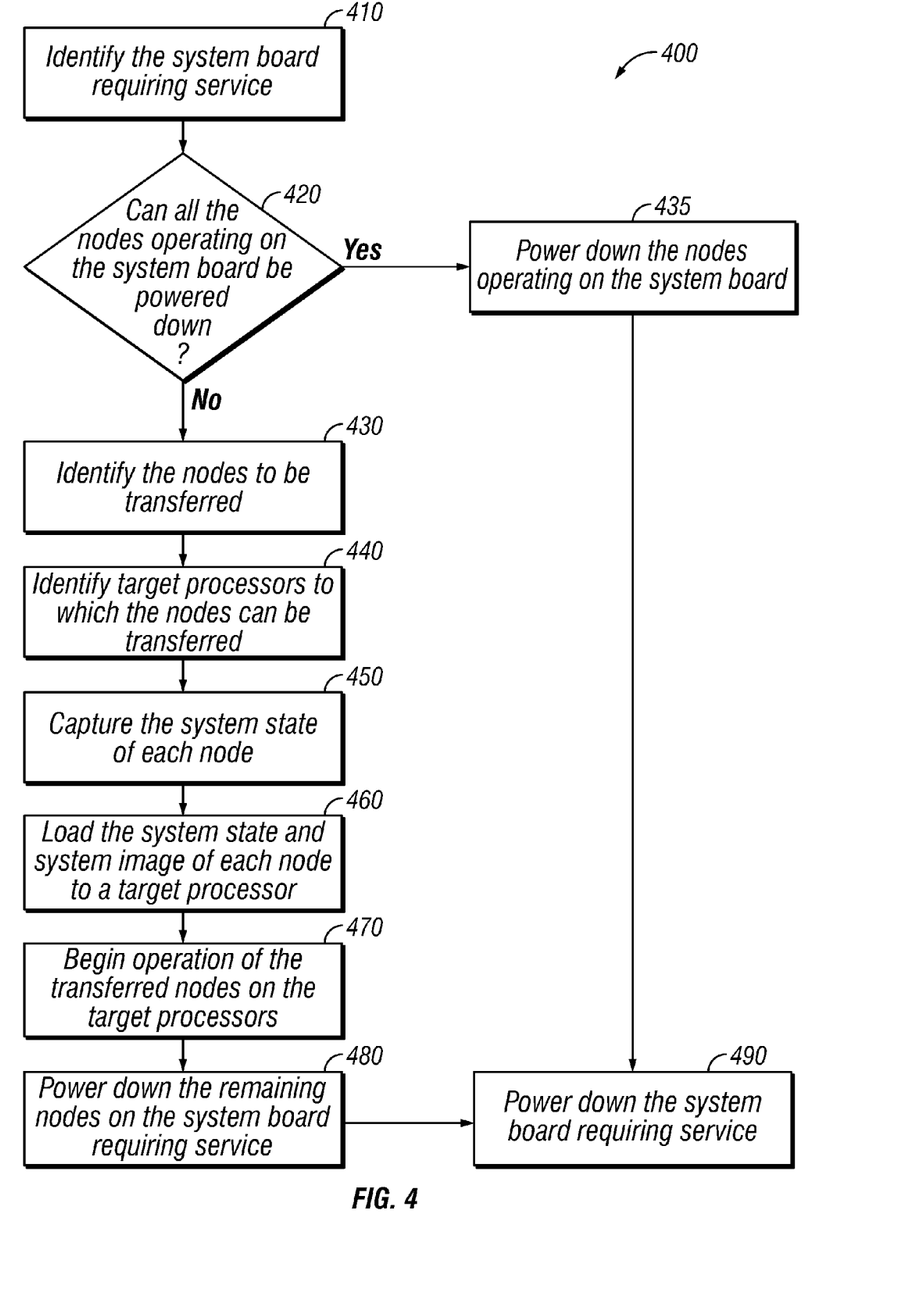
FIG. 4 illustrates a flowchart of an example method of reducing downtime in a dense node environment, in accordance with the teachings of the present disclosure.

FIG. 4 illustrates an example method of reducing downtime in a dense node environment by transferring nodes from one system board to another in accordance with the teachings of the present disclosure. At step 410, the CMC may identify a system board that requires service. In some embodiments, service to system boards may be scheduled by a system administrator. In other embodiments, service to a system board may be necessary because of a system failure or event. At step 420, the CMC may determine whether all the nodes operating on the system board requiring service may be powered down. As discussed above, a distributed application may operate on several nodes spread across several system boards. The nodes on which a distributed application is running may be configured to tolerate failure of at least one of the nodes because, when one of the several nodes experiences a failure or an error, the operations performed by that node may be assumed by the remaining nodes. Thus, in the case of a particular system board requiring service, the nodes on which a distributed application is running may be powered down instead of being transferred, while the remaining nodes may be identified for transfer. If it is determined that all the nodes operating on the system board requiring service may be powered down, the method may proceed to step 435. At step 435, the nodes on the system board requiring service may be powered down and the method may proceed to step 490. At step 490, the system board requiring service may be powered down.

If, on the other hand, it is determined that some, or all, of the nodes operating on the system board requiring service should be transferred instead of powered down, the method may proceed to step 430. At step 430, the CMC may identify the nodes that will be transferred to another system board. Once the CMC has identified the nodes that will be transferred, the method may proceed to step 440.

At step 440, the CMC may identify a target processor to which each of the nodes may be transferred. As discussed above, target processors may be unused processors on other system boards in the information handling system. When a target processor has been identified for each node identified for transfer, the method may proceed to step 450. At step 450, the CMC may capture the system state of the nodes identified for transfer. As discussed above, the CMC may capture the system state of a node by, for example, freezing all processes running on the node and saving a snapshot of those processes to memory of the CMC.

At step 460, the system state and system image for each of the nodes identified for transfer may be transferred to the target processors. An operating system image may include all the data necessary to operate a particular node. For example, an operating system image may include the operating system and applications running on the node, as well as configuration and files for the operating system and applications running on the node.

As discussed above, an operating system image for each node may be stored on an internal or external storage resource or on a memory device of the system board. In some embodiments, each system board may include a memory device on which system images for the nodes operating on that system board are stored. In other embodiments, the chassis of an information handling system may include internal storage on which system images are stored. The internal storage may include one or more storage resources, each of which may be allocated to a particular system board or shared among the system boards. In still other embodiments, an information handling system may include external storage on which system images are stored. The external storage may be communicatively coupled to the system boards via a network and may include one or more storage resources, each of which may be allocated to a particular system board or shared among the system boards.

Where each of the storage resources or memory devices are allocated to a particular system board, both the system state and system image may be transferred by the CMC because the target processor may not otherwise have access to the system image for that node. Where, on the other hand, each of the storage resources is shared among the system boards, the system state of the nodes identified for transfer may be captured and transferred by the CMC, while the system image may be accessed directly by the target processor.

At step 470, operation of the transferred nodes may begin on the target processors. As discussed above, the target processors may be initialized in a pre-execution environment (PXE) and the system state and system image of the transferred nodes may be loaded on the target processors. Once the transferred nodes have begun operation on the target processors, the method may proceed to step 480.

At step 480, the remaining nodes on the system board requiring service may be powered down. Once the nodes operating on the system board requiring service have been either transferred or powered down, the method may proceed to step 490. At step 490, the system board requiring service may be powered down for service.

Although the examples discussed in detail above address powering down or transferring nodes based on the need to service a system board on which the nodes are operating, the methods disclosed herein may be utilized to reduce or eliminate downtime in the event that a component shared by multiple nodes must be powered down or otherwise taken off-line for service.

Further, although the present disclosure has been described in detail, it should be understood that various changes, substitutions, and alterations can be made hereto without departing from the spirit and the scope of the disclosure as defined by the appended claims.

What is claimed is:
1. A method of reducing downtime in a node environment, the method comprising:
    identifying an originating system board of a plurality of system boards that requires service, the originating system board including a first node and a second node operating on a processor;
    identifying the first node for powering down based on a determination that a distributed application is operating on the first node and a node on another system board, the node on the other system board operable to assume operations performed by the first node when the first node is powered down;
    identifying the second node for transfer to a target processor on a target system board of the plurality of system boards;
    powering down the first node before the originating system board is serviced; and
    transferring operation of the second node to the target processor before the originating system board is serviced.

2. The method of claim 1, wherein transferring operation of the second node to the target processor comprises:
    booting the target processor; and
    loading a system state and an operating system image of the second node on the target processor.

3. The method of claim 2, wherein loading the system state on the target processor comprises:
    freezing processes running on the second node;
    saving the system state of the second node, the system state including a snapshot of the processes running on the second node; and
    transmitting the system state to the target processor.

4. The method of claim 2, wherein loading the operating system image on the target processor comprises transmitting the operating system image to the target processor from a storage resource allocated to the originating system board.

5. The method of claim 2, wherein loading the operating system image on the target processor comprises the target processor accessing the operating system image from a shared storage resource.

6. An information handling system, comprising:
    a plurality of system boards;
    a plurality of storage devices communicatively coupled to the plurality of system boards; and
    a controller communicatively coupled to the plurality of system boards and the plurality of storage devices, the controller configured to:
        identify an originating system board of the plurality of system boards that requires service, the originating system board including a first node and a second node operating on a processor;
        identify the first node for powering down based on a determination that a distributed application is operating on the first node and a node on another system board, the node on the other system board operable to assume operations performed by the first node when the first node is powered down;
        identify the second node for transfer to a target processor on a target system board of the plurality of system boards;
        power down the first node before the originating system board is serviced; and
        transfer operation of the second node to the target processor before the originating system board is serviced.

7. The system of claim 6, the controller further configured to:

identify a third node operating on a second processor of the originating system board for transfer to a second target processor on a second target system board of the plurality of system boards;

transfer the operation of the third node to the second target processor before the originating system board is serviced.

8. The system of claim 6, wherein transferring operation of the second node operating on the originating system board to the target processor comprises:

booting the target processor; and loading a system state and an operating system image of the second node on the target processor.

9. The system of claim 8, wherein loading the system state on the target processor comprises:

freezing processes running on the second node;

saving the system state of the second node, the system state including a snapshot of the processes running on the second node; and transmitting the system state to the target processor.

10. The system of claim 8, wherein loading the operating system image on the target processor comprises the target processor accessing the operating system image from a storage device of the plurality of storage devices, the storage device shared by the plurality of system boards.

11. The system of claim 8, wherein loading the operating system image on the target processor comprises transmitting the operating system image to the target processor from a storage device of the plurality of storage devices, the storage device allocated to the originating system board.

12. A non-transitory computer-readable medium including computer-executable instructions encoded in the computer-readable medium, the instructions, when executed by a processor, operable to perform operations comprising:

identifying an originating system board of a plurality of system boards that requires service, the originating system board including a first node and a second node operating on a processor;

identifying the first node for powering down based on a determination that a distributed application is operating on the first node and a node on another system board, the node on the other system board operable to assume operations performed by the first node when the first node is powered down;

identifying the second node for transfer to a target processor on a target system board of the plurality of system boards;

powering down the first node before the originating system board is serviced; and transferring operation of the second node to the target processor before the originating system board is serviced.

13. The computer-readable medium of claim 12, the computer-executable instructions, when executed by a processor, further operable to perform operations comprising:

identifying a third node operating on a second processor of the originating system board for transfer to a second target processor on a second target system board of the plurality of system boards;

transferring operation of the third node to the second target processor before the originating system board is serviced.

14. The computer-readable medium of claim 12, wherein transferring operation of a second node operating on the originating system board to the target processor comprises:

booting the target processor; and loading a system state and an operating system image of the second node on the target processor.

15. The computer-readable medium of claim 14, wherein loading the system state on the target processor comprises:

freezing processes running on the second node;

saving the system state of the second node, the system state including a snapshot of the processes running on the second node; and transmitting the system state to the target processor.

16. The computer readable medium of claim 14, wherein loading the operating system image on the target processor comprises transmitting the operating system image to the target processor from a storage device allocated to the originating system board.

17. The computer readable medium of claim 14, wherein loading the operating system image on the target processor comprises instructing the target processor to access the operating system image from a shared storage device.

* * * * *